United States Patent
Vassilvitskii et al.

(10) Patent No.: US 10,217,118 B2
(45) Date of Patent: Feb. 26, 2019

(54) SYSTEMS AND METHODS FOR IMPLEMENTING BID ADJUSTMENTS IN AN ONLINE ADVERTISEMENT EXCHANGE

(71) Applicant: Excalibur IP, LLC, New York, NY (US)

(72) Inventors: Sergei Vassilvitskii, New York, NY (US); Eric Bax, Altadena, CA (US); R. Preston McAfee, San Marino, CA (US); Mohammad Mahdian, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 213 days.

(21) Appl. No.: 13/664,041

(22) Filed: Oct. 30, 2012

(65) Prior Publication Data
US 2014/0122253 A1     May 1, 2014

(51) Int. Cl.
*G06Q 30/02*     (2012.01)

(52) U.S. Cl.
CPC ......... *G06Q 30/02* (2013.01); *G06Q 30/0275* (2013.01)

(58) Field of Classification Search
USPC .................................................. 705/1–20, 37
See application file for complete search history.

(56) References Cited

U.S. PATENT DOCUMENTS

| | | | |
|---|---|---|---|
| 6,862,572 B1 | 3/2005 | de Sylva | |
| 2008/0133397 A1* | 6/2008 | Tulloch | G06Q 30/02 705/37 |
| 2010/0223141 A1* | 9/2010 | Spencer | G06Q 30/02 705/14.71 |
| 2010/0332306 A1* | 12/2010 | Darveau-Garneau | G06Q 30/08 705/14.23 |
| 2011/0231264 A1* | 9/2011 | Dilling | G06Q 30/02 705/14.71 |
| 2012/0030034 A1* | 2/2012 | Knapp | G06Q 30/02 705/14.71 |

OTHER PUBLICATIONS

U.S. Patent and Trademark Office Patent Trial and Appeal Board (PTAB) Decision on Appeal—Appeal No. 2016-002496, U.S. Appl. No. 13/614,947, filed Sep. 13, 2012—dated Jun. 29, 2017 (11 pages).

* cited by examiner

*Primary Examiner* — Tarek Elchanti
(74) *Attorney, Agent, or Firm* — Brinks Gilson & Lione

(57) ABSTRACT

A system and method for implementing bid adjustments in an online advertisement exchange are disclosed. A plurality of bids from a plurality of advertisers may be received for an online advertisement opportunity. A first advertiser may be associated with a first bid bias value. In some embodiments, if the first advertiser is associated with a first bid bias value, then the bid received from the first advertiser may be adjusted based on the first bid bias value. For example, an adjusted bid may be calculated based on the bid received from the first advertiser and the first bid bias value. The online advertisement exchange may conduct an online auction with the adjusted bid from the first advertiser. If the first advertiser wins the auction based on the adjusted bid, then the first advertiser may be charged the value of the bid received from the first advertiser instead of the adjusted bid value.

19 Claims, 11 Drawing Sheets

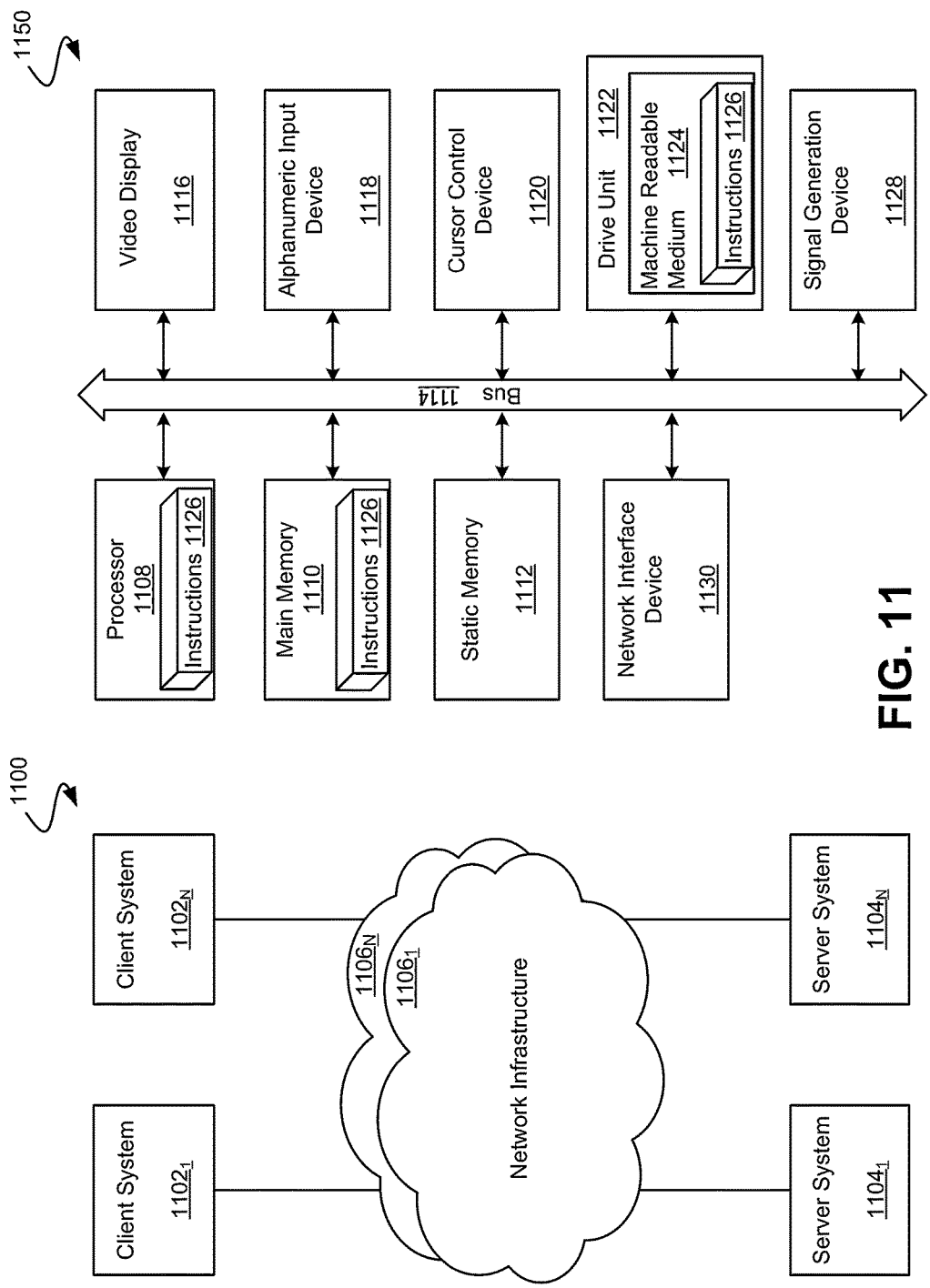

SYSTEMS AND METHODS FOR IMPLEMENTING BID ADJUSTMENTS IN AN ONLINE ADVERTISEMENT EXCHANGE

FIELD

The present disclosure relates to systems and methods for an online advertisement exchange. In some embodiments, the disclosure relates to systems and methods for implementing bid adjustments in an online advertisement exchange.

BACKGROUND

The Internet is a ubiquitous medium of communication in most parts of the world. The emergence of the Internet has opened a new forum for the creation and placement of advertisements promoting products, services, and brands. Internet content providers rely on advertising revenue to drive the production of free or low cost content. Advertisers, in turn, increasingly view Internet content portals and online publications as a critically important medium for the placement of advertisements.

The interactive nature of Internet communication enables advertisers and content providers to target advertising campaigns to viewers. Advertisers may participate in an online advertisement exchange by placing bids for the display of an advertisement to a viewer. For example, multiple advertisers may each place a bid for the display of an advertisement to a viewer. However, such traditional online advertisement exchanges are limited.

As such, it is desirable to develop systems and methods for implementing bid adjustments in an online advertisement exchange.

SUMMARY

The present disclosure introduces systems and methods to implement bid adjustments in an online advertisement exchange.

The systems or methods may conduct an online auction. For example, the systems or methods may receive a first bid from a first advertiser for an online advertisement opportunity. In some embodiments, the first bid indicates a first bid value. A second bid may be received from a second advertiser for the online advertisement opportunity. In some embodiments, the second bid indicates a second bid value. The systems or methods may determine if the first advertiser is associated with a first bid bias value and may adjust, if the first advertiser is associated with the first bid bias value, the first bid value of the first bid from the first advertiser based on the first bid bias value to calculate a first adjusted bid value. The system or method may award, by a computer, the online advertisement opportunity to the first advertiser if the first adjusted bid value is higher than the second bid value. In some embodiments, the system or method may charge the first advertiser the first bid value if the first advertiser is awarded the online advertisement opportunity based on the first adjusted bid value.

In some embodiments, the first adjusted bid value may be calculated by increasing or decreasing the first bid value by a factor specified by the first bid bias value.

In some embodiments, the determination of the first advertiser being associated with the first bid bias value may comprise determining if the first advertiser matches at least one predefined advertiser attribute.

In some embodiments, the predefined advertiser attribute comprises an advertising budget associated with the first advertiser.

In the same or an alternative embodiment, the predefined advertiser attribute comprises an identification of the first advertiser as being associated with an advertiser group that identifies a plurality of advertisers.

In some embodiments, the predefined advertiser attribute comprises targeting information associated with the first advertiser.

In some embodiments, the first bid value is lower than the first adjusted bid value and the first bid bias value comprises a discount for the first advertiser such that the charging of the first advertiser with the first adjusted bid value is lower than charging the first advertiser with the first bid value.

BRIEF DESCRIPTION OF THE DRAWINGS

The novel features of the disclosure are set forth in the appended claims. However, for purpose of explanation, several embodiments of the disclosure are set forth in the following figures.

FIG. 11 depicts a diagram illustrating an exemplary computing system for execution of the operations comprising various embodiments of the disclosure.

DETAILED DESCRIPTION

Figure 1:
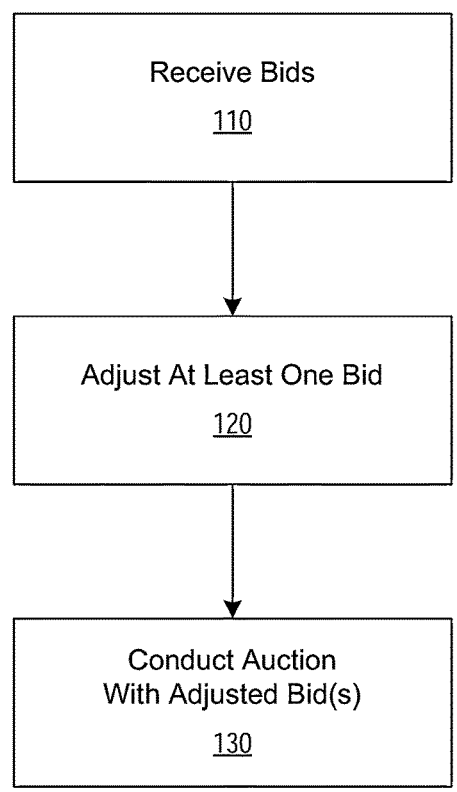
FIG. 1 is a flow diagram of an example method to conduct an online auction based on at least one adjusted bid in accordance with some embodiments.

The systems and methods disclosed herein relate to adjusting bids in an online advertisement exchange.

In the following detailed description, numerous specific details are set forth in order to provide a thorough understanding of the present disclosure. However, it will become obvious to those skilled in the art that the present disclosure may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present disclosure.

The disclosure that follows is divided into four sections. Section I contains terms used herein. Section II describes systems and methods for implementing bid adjustments in an online advertisement exchange. Section III describes an environment in which some embodiments of the present disclosure may operate.

I. Terms

Some of the terms used in the disclosure are defined below in alphabetical order. These terms are not rigidly restricted to these definitions. A term may be further defined by the term's use in other sections of the disclosure.

"Ad" (e.g., advertisement, item and/or message) may refer to a paid announcement, as of goods or services for sale. An ad may also be referred to as an advertisement.

"Ad call" may refer to a message sent by a computer to an ad server for requesting an ad to be displayed (e.g., within an email). An "ad call" may be referred to as an "advertisement call."

"Ad server" may refer to a server that is configured for serving one or more ads to user devices. An ad server may be controlled by a publisher of a website, email server, and/or an advertiser of online ads. A server is defined below.

"Advertiser" may refer to an entity that is in the business of marketing a product and/or a service to users. An advertiser may include, without limitation, a seller and/or a third-party agent for the seller. An advertiser may also be referred to as a messenger and/or a messaging customer.

"Advertising" may refer to marketing a product and/or service to one or more potential consumers by using an advertisement.

"Application server" may refer to a server that is configured for running one or more devices loaded on the application server.

"Click" (e.g., ad click) may refer to a selection of an ad impression by using a selection device such as, for example, a computer mouse or a touch-sensitive display on a user device (e.g., a mobile device such as a smart phone).

"Client" may refer to the client part of client-server architecture. A client may comprise a user device and/or an application that runs on a user device. A client may rely on a server to perform operations. For example, an email client is an application that enables a user to send and receive email via an email server. As such, the computer running such an email client may also be referred to as a client.

"Conversion" (e.g., ad conversion) may refer to a purchase of a product and/or service that occurs as a result of a user responding to an advertisement.

"Database" (e.g., database system, etc.) may refer to a collection of data organized in such a way that a computer program may quickly select desired pieces of the data. A database may be an electronic filing system. In some instances, the term "database" may be used as shorthand for a "database management system." A database may be implemented as any type of data storage structure capable of providing for the retrieval and storage of a variety of data types. For example, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" may refer to hardware, software or a combination thereof. A device may sometimes be referred to as an apparatus. Examples of a device include, without limitation, a software application such as Microsoft Word™, an email application, or a database or hardware such as a laptop computer, a mobile device such as a smart phone, a server, a display, or a computer mouse and/or a hard disk.

"Impression" (e.g., ad impression) may refer to a delivery of an advertisement to a user device for viewing by a user.

"Item" may refer to an ad, which is defined above.

"Marketplace" may refer to a world of commercial activity where products and/or services are browsed, bought and/or sold, etc. A marketplace may be located over a network, such as the Internet. A marketplace may also be located in a physical environment, such as a shopping mall.

"Message" may refer to an ad, which is defined above.

"Messaging" may refer to advertising, which is defined above.

"Messenger" may refer to an advertiser, which is defined above.

"Network" may refer to a connection, between any two or more computers, that permits the transmission of data. A network may be any combination of networks including, without limitation, the Internet, a local area network, a wide area network, a wireless network, and/or a cellular network.

"Publisher" may refer to an entity that publishes, on a network, a web page having content and/or ads, etc.

"Server" may refer to a software application that provides services to other computer programs (and their users), on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Software" may refer to a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" may refer to a device or multiple coupled devices. A device is defined above.

"User" (e.g., consumer) may refer to an operator of a user device. A user may be a person who seeks to acquire a product and/or service. For example, a user may be a person who has composed an email or a person who has received an email with an inserted custom click to call advertisement. The term "user" may also refer to a user device, depending on the context.

"User device" (e.g., computer, mobile device, user computer, client and/or server, etc.) may refer to a single computer, mobile device, or a network of interacting computers. A user device may be a computer that a user may use to communicate with other devices over a network, such as the Internet. A user device may comprise a combination of a hardware system, a software operating system, and one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

II. Implementing Bid Adjustments in an Online Advertisement Exchange

FIG. 1 is a flow diagram of a method 100 to conduct an online auction based on at least one adjusted bid in accordance with some embodiments. As seen in FIG. 1, at block 110, a plurality of bids may be received. For example, a plurality of advertisers may receive a notification of an advertisement opportunity (e.g., an advertisement call) and each of the advertisers may submit a bid to an online advertisement exchange for the advertisement opportunity. Further details on the online advertisement exchange are discussed with relation to FIGS. 8-10. At block 120, at least one bid from at least one of the advertisers who have responded to the advertisement call may be adjusted. For example, a bid bias, adjustment, multiplier, and/or factor may be applied to the bid from at least one advertiser to generate one or more adjusted bids. Further details with regard to the adjusted bid are discussed with relation to FIGS. 2-5. At block 130, an auction may be conducted with the at least one adjusted bid. In the same or alternative embodiments, the auction may be conducted with at least one adjusted bid and at least one bid that has not been adjusted (e.g., an unadjusted bid). The conducting of the auction may result in a determination of which advertiser who has placed a bid will be awarded the advertisement opportunity. For example, the at least one adjusted bid may be associated with an adjusted bid value and the at least one bid that has not been adjusted may be associated with a second bid value. The conducting of the auction may result in awarding the advertisement opportunity to the larger of the adjusted bid value and the second bid value.

As such, the method 100 may receive a first bid from a first advertiser and a second bid from a second advertiser for an online advertisement opportunity. In some embodiments, the first advertiser may be associated with a bid bias, discount, or markup (e.g., a bid adjustment) and the second advertiser may not be associated with a bid bias, discount, or markup. The first bid from the first advertiser may be adjusted based on the bid bias associated with the advertiser to generate a first adjusted bid. For example, a multiplier may be applied to the value of the first bid to generate the first adjusted bid value (e.g., a multiplier of 25% may be applied to a first bid value of $1 to generate a first adjusted bid of a value of $1.25). As such, an online auction for the online advertisement opportunity may be conducted between the first adjusted bid and the second bid. If the first adjusted bid value is higher than the second bid, then the advertisement opportunity may be awarded to the first advertiser associated with the first adjusted bid. However, if the second bid associated with the second advertiser is higher than the first adjusted bid value, then the advertisement opportunity may be awarded to the second advertiser. Thus, the method 100 may receive bids from advertisers, adjust at least one of the bids, and conduct an auction with the adjusted bid and any unadjusted bids.

Figure 2:
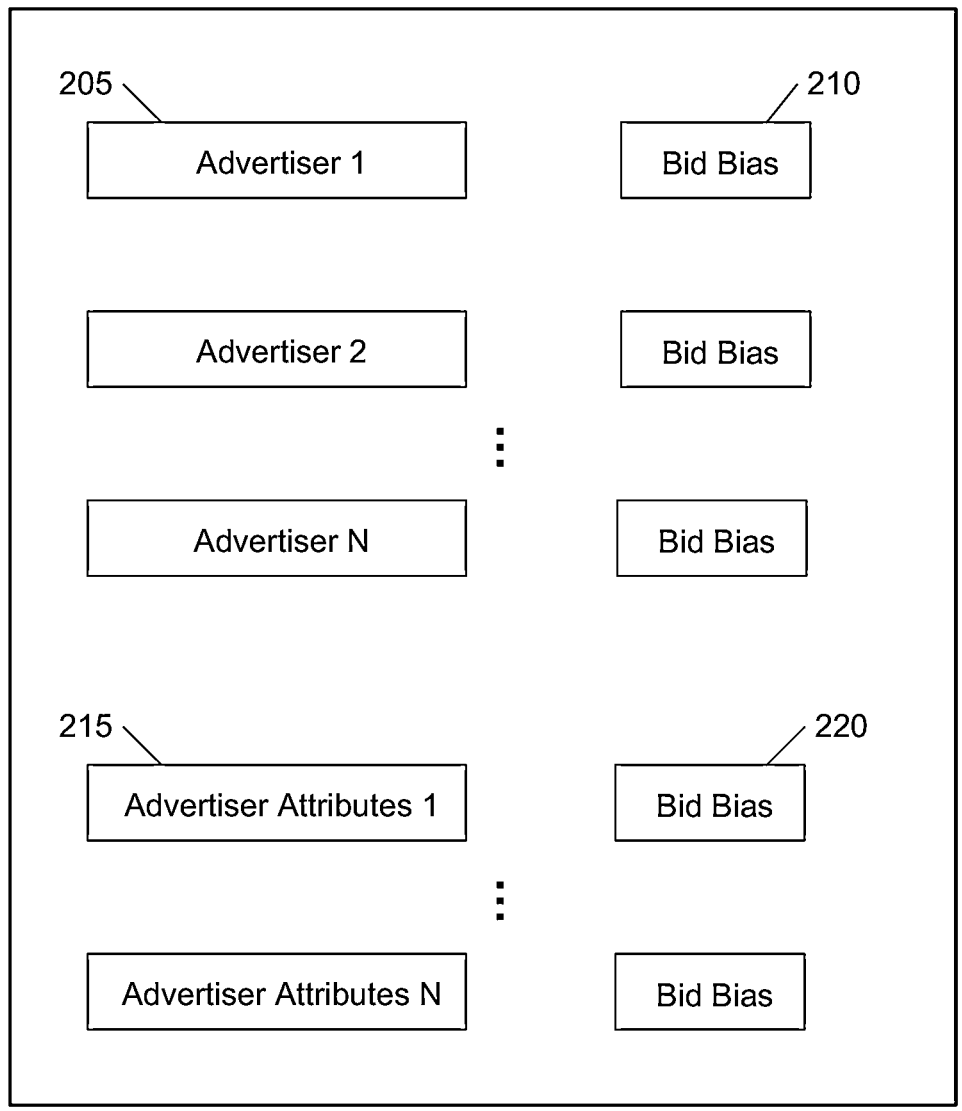
FIG. 2 illustrates an example graphical user interface to specify a bid bias for one or more advertisers.

FIG. 2 illustrates an example graphical user interface 200 to specify a bid bias for one or more advertisers. In general, the graphical user interface 200 may be used to specify, determine, and/or assign a bid bias to an advertiser. In some embodiments, a publisher (e.g., owner of content or a website) may use the graphical user interface 200 to specify, determine, and/or assign a bid bias (e.g., a particular bid bias value) to an advertiser.

As seen in FIG. 2, the graphical user interface 200 may comprise advertiser fields and bid bias value fields. For example, an advertiser field 205 may be used to specify and/or identify a specific advertiser and a bid bias field 210 may be used to specify, determine, and/or assign a bid bias to the corresponding specific advertiser. As such, one or more bid bias values may be assigned to one or more specified or identified advertisers.

In some embodiments, bid bias values may be specified, determined, and/or assigned to advertisers based on advertiser attributes. For example, the graphical user interface 200 may comprise an advertiser attribute field 215 to specify advertiser attributes and a bid bias field 220 to specify, determine, and/or assign a bid bias value to advertisers who match the corresponding advertiser attributes. In some embodiments, the advertiser attribute field 215 may be used to specify advertisers based on advertiser budgets and/or amount of money that the advertisers have spent on advertisement opportunities with the publisher. For example, a first advertiser attribute field may be used to specify advertisers with a budget between a first budget value and a second budget value (e.g., between $500,000 to $1,000,000) and a second advertiser attribute field may be used to specify advertisers with a budget between a third budget value and a fourth budget value (e.g., between $100,000 to $400,000). In some embodiments, each of the first advertiser attribute field and the second advertiser attribute field may correspond to a different bid bias value. For example, the first advertiser attribute field may correspond to a first bid bias value of 30% and the second advertiser attribute field may correspond to a second bid bias value of 25%. As such, advertisers who match the attributes specified in the first advertiser attribute field may have their bids adjusted by the first bid bias value of 30% and advertisers who match the attributes specified in the second advertiser attribute field may have their bids adjusted by the second bid bias value of 25%.

In some embodiments, the advertiser attribute field 215 of FIG. 2 may comprise advertiser attributes to identify advertisers who match advertiser or advertisement features such as a geographical location of the advertiser (e.g., whether the advertiser is based in the United States or is based outside of the United States), a demographic category associated with the advertiser (e.g., a target audience that the advertiser is targeting), and a categorization of the advertiser (e.g., whether the advertiser is associated with technology or health or medicine, etc.).

As such, one or more advertiser attributes or features may be specified such that a corresponding bid bias may be applied to any advertisers that matches the specified advertiser attributes or features.

Figure 3:
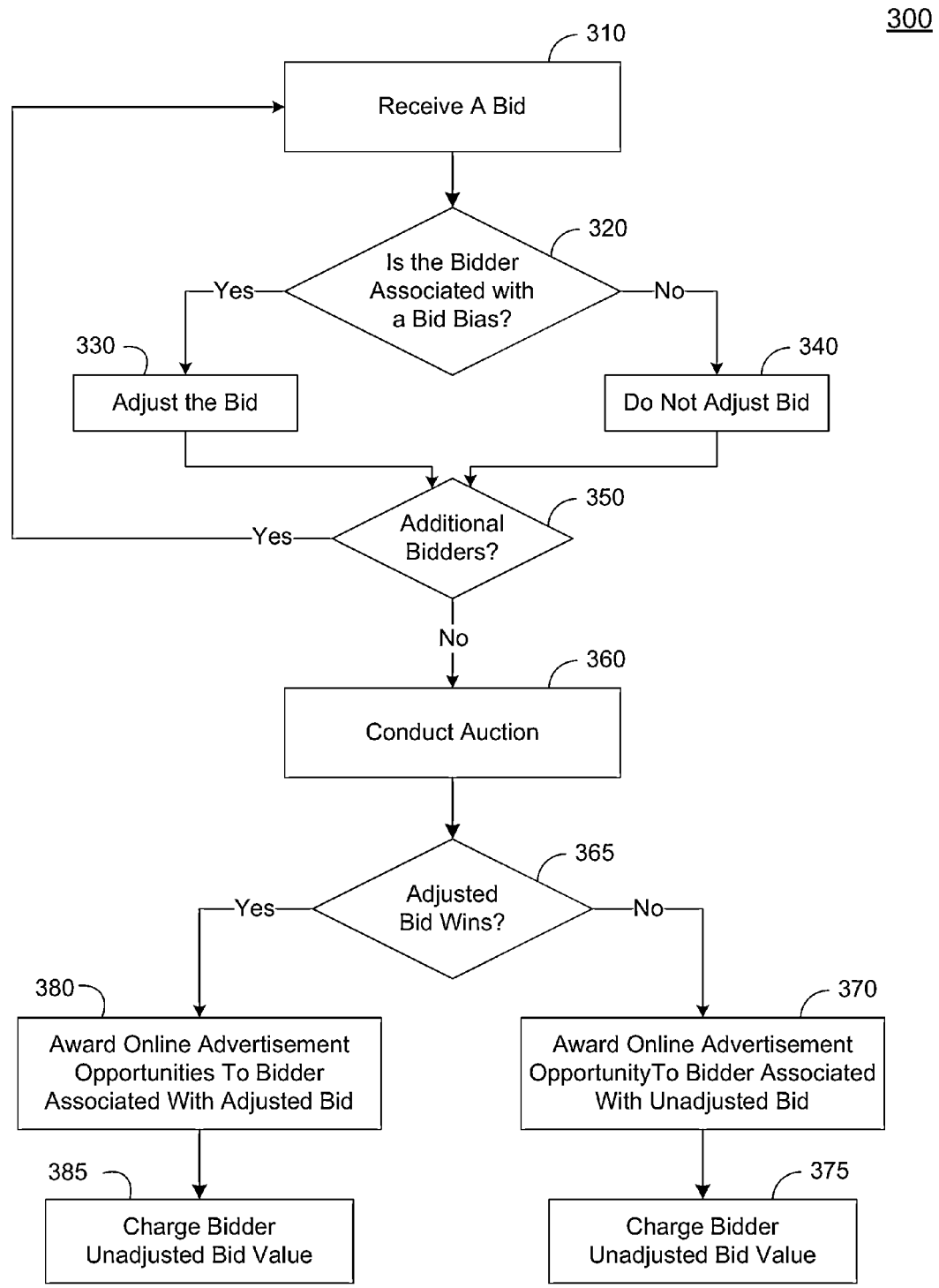
FIG. 3 is a flow diagram of an example method to receive one or more bids from one or more bidders and determining whether to adjust the one or more bids.

FIG. 3 is a flow diagram of a method 300 to receive one or more bids from one or more bidders and to determine whether to adjust the one or more bids. As seen in FIG. 3, at block 310, a bid may be received. For example, a bid for an online advertisement opportunity may be received from a bidder (e.g., an online advertiser). At block 320, a determination may be made as to whether the bidder is associated with a bid bias value. For example, the bidder may be identified as an advertiser from an advertiser field (e.g., advertiser field 205) or may be determined to match advertiser attributes from an advertiser attribute field (e.g., advertiser attribute field 215). If the bidder is not associated with a bid bias value, then at block 340, the bid received from the bidder is not adjusted. However, if the bidder is associated with a bid bias value (e.g., the bidder is identified from the advertiser field 205 or matches the advertiser attribute field 215), then at block 330, a bid value of the bid received from the bidder may be adjusted. For example, the bid may be adjusted based on a bid bias value (e.g., a bid bias value specified by bid bias value field 210 and/or 220). In some embodiments, the bid value may be adjusted based on the bid bias value to generate an adjusted bid value. For example, if the bid value is $1.00 and the bid bias value is 50%, then the adjusted bid value may be $1.50. As such, the bid bias value may provide a bonus or discount to the bidder. In some embodiments, the bid bias value may be used to penalize a bidder. For example, a bid value of $1.00 may be adjusted by subtracting a portion of the bid value to calculate an adjusted bid value. For example, a negative bid bias value of −25% may be applied to the bid value of $1.00 to result in an adjusted bid value of $0.75. As such, in some embodiments, a bid bias value may correspond to a discount value. In some embodiments, a bid may be adjusted by the inverse of its bid bias value.

As seen in FIG. 3, at block 350, bids from additional bidders may be received. In some embodiments, the steps as disclosed with relation to blocks 310, 320, and 330 or 340 may be repeated for each additional bid from each additional bidder. At block 360, an auction may be conducted for the bidders. In some embodiments, the auction may be conducted with the adjusted bids from 330 and the bids that have not been adjusted from block 340. At block 365, a determination is made as to which bidder wins or is awarded the online advertisement opportunity. In some embodiments, the highest bid value is determined to have won the auction. If a bid that is not adjusted (e.g., an unadjusted bid) wins (e.g., an adjusted bid does not win), then at block 370, the online advertisement opportunity may be awarded to the bidder associated with the unadjusted bid. Moreover, at block 375, the bidder may be charged the unadjusted bid value. However, if an adjusted bid wins and/or is awarded the online advertisement opportunity, then at block 380, the online advertisement opportunity may be awarded to the bidder associated with the winning adjusted bid. Moreover, at block 385, the bidder corresponding with the winning adjusted bid value may be charged the bidder's unadjusted bid value.

As such, the method 300 may receive online bids from online advertisers for an online advertisement opportunity. Each of the received bids may be associated with a bid value. At least one of the online bids may be adjusted based on a bid bias value. For example, the bid value of the online bid may be adjusted based on the bid bias value. The auction may be conducted with the adjusted bids. However, if an adjusted bid wins the auction, the bidder is charged the bid value originally submitted by the bidder.

Figure 4:
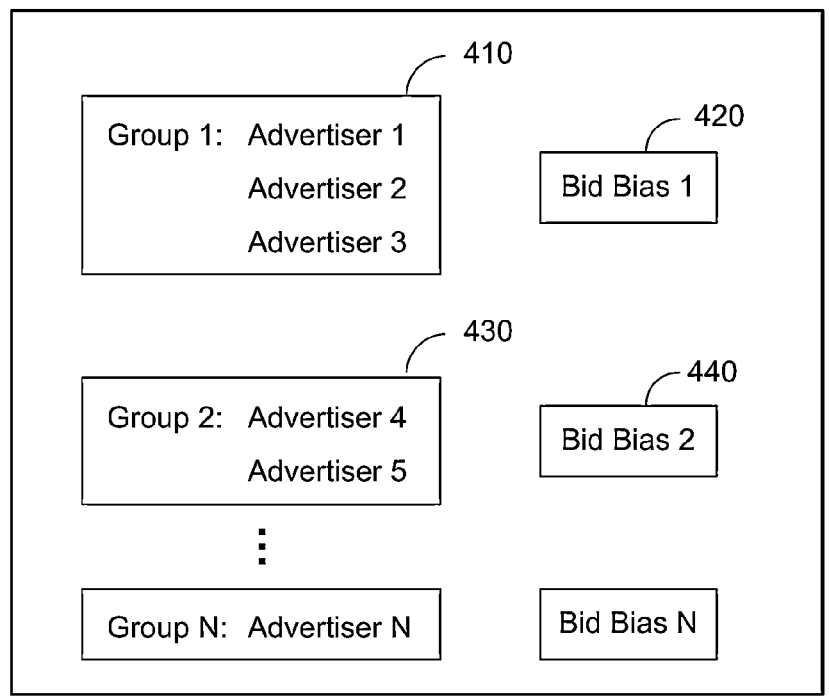
FIG. 4 is an example graphical user interface to group one or more advertisers into predefined groups and applying a bid bias to the group in accordance with some embodiments.

FIG. 4 illustrates an example graphical user interface 400 to group one or more advertisers into predefined groups. In general, the graphical user interface 400 may be used (e.g., by a publisher of a website) to apply a bid bias value to a group of advertisers.

As seen in FIG. 4, the graphical user interface 400 may comprise one or more advertiser group fields 410. In some embodiments, the advertiser group field 410 may be used to group advertisers into a group. For example, a publisher of a website may use the advertiser group field 410 of the graphical user interface 400 to specify one or more advertisers and/or advertiser attributes (as discussed with relation to FIG. 3) to group advertisers and/or advertisers who match advertiser attributes into predefined groups. For example, a first advertiser, a second advertiser, and a third advertiser may be grouped to create a first advertiser group. Moreover, a fourth advertiser and a fifth advertiser may be grouped to create a second advertiser group. As such, a first advertiser group field 410 may be used to define one or more advertisers and/or advertiser attributes to create a first advertiser group and a second advertiser group field 430 may be used to define one or more advertisers and/or advertiser attributes to create a second advertiser group. In some embodiments, the graphical user interface 400 may be used to specify bid bias values (e.g., bid discounts, bid penalties, etc.) to apply to the advertisers specified in a corresponding advertiser group field and/or advertisers that match advertiser attributes specified in a corresponding advertiser group field. As such, a first bid bias field 420 may be used to specify a bid bias value to be applied to any bids received from any advertisers specified by the first advertiser group field 410 and a second bid bias field 440 may be used to specify a bid bias value to be applied to any bids received from any advertisers specified by the second advertiser group field 430.

As such, the graphical user interface 400 may be used to specify and/or identify one or more advertisers as belonging to an advertiser group. Bid bias values may be applied to the advertiser group such that any bid received from any advertiser specified and/or identified by the advertiser group may adjusted based on the bid bias value corresponding to the advertiser group.

Figure 5:
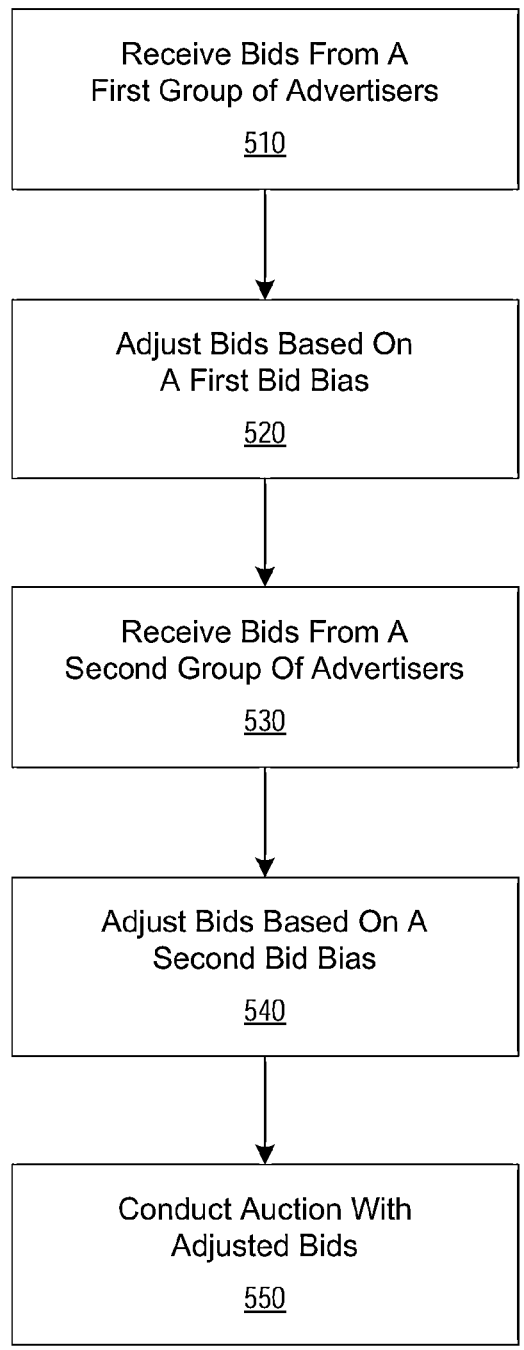
FIG. 5 is an example method to receive bids from advertisers categorized in groups and adjusting the bids from the advertisers based on the groups.

FIG. 5 is an example method 500 to receive bids from advertisers categorized in groups and adjusting the bids from the advertisers based on the groups. As seen in FIG. 5, at block 510, online bids for an online advertisement opportunity (e.g., an advertisement impression opportunity on a publisher's website) may be received from advertisers identified or specified by a first group of advertisers. For example, the first group of advertisers may be specified by an advertiser group field (e.g., advertiser group field 410 and/or 430). As such, bids may be received from one or more advertisers that have been identified as part of the first group of advertisers. At block 520, bids received from the one or more advertisers that have been identified as part of the first group of advertisers may be adjusted. For example, the first group of advertisers may be associated with a first bid bias value (e.g., specified by a bid bias field 420 and/or 440). As such, the bid value of the bids received from the one or more advertisers may be adjusted based on the first bid bias value. At block 530, online bids for the online advertisement opportunity may be received from advertisers identified or specified by a second group of advertisers. For example, the second group of advertisers may be identified and/or specified by a second advertiser group field (e.g., advertiser group field 410 and/or 430). As such, bids may be received from one or more advertisers that have been identified as part of the second group of advertisers. At block 540, bids received from the one or more advertisers that have been identified as part of the second group of advertisers may be adjusted. For example, the second group of advertisers may be associated with a second bid bias value (e.g., specified by a bid bias field 420 and/or 440). As such, the bid value of the bids received from the one or more advertisers identified by the second advertiser group may be adjusted based on the second bid bias value. At block 550, an auction may be conducted between the first advertiser group and the second advertiser group. For example, the auction may determine the highest bid value out of the adjusted bids from the advertisers of the first advertiser group and the adjusted bids from the advertisers of the second advertiser group. As such, one advertiser may be awarded the online advertisement opportunity and the advertiser may be charged the bid value originally submitted (e.g., the unadjusted bid value as received at blocks 510 or 530).

As such, a plurality of bids for an online advertisement opportunity may be received from a plurality of advertisers. One or more of the advertisers may be associated with a first advertiser group and one or more of the advertisers may be associated with the second advertiser group. The first advertiser group may be associated with a first bid bias value and the second advertiser group may be associated with a second bid bias value. In some embodiments, the bids received from the advertisers associated with the first advertiser group may be adjusted based on the first bid bias value and the bids received from the advertisers associated with the second advertiser group may be adjusted based on the second bid bias value. As such, the bids received from the advertisers may be adjusted to calculate adjusted bid values. An auction may be conducted to determine a highest value out of the adjusted bid values and any advertisers that have not been identified by an advertiser group. An advertiser may be awarded the online advertisement opportunity if the advertiser's bid value is the highest bid value. As such, if an advertiser with an adjusted bid win the auction, the advertiser may be charged the bid value that is originally received (e.g., the unadjusted bid).

Figure 6:
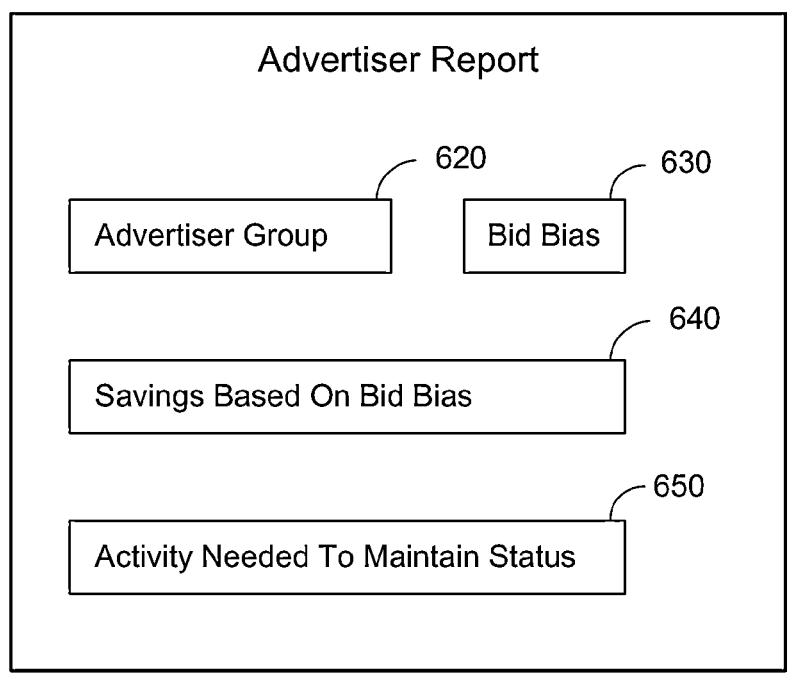
FIG. 6 is an example graphical user interface to display a report associated with an advertiser in accordance with some embodiments.

FIG. 6 is an example graphical user interface 600 to display a report associated with an advertiser in accordance with some embodiments. In general, the graphical user interface 600 may be used to show an advertiser any savings based on the advertiser's corresponding bid bias and/or activity needed to maintain the advertiser's corresponding bid bias.

As seen in FIG. 6, the graphical user interface 600 may display an advertiser report. The advertiser report may display an advertiser's bidding information. For example, an advertiser group field 620 may indicate an advertiser group (e.g., as previously discussed with relation to FIG. 4) to which the advertiser is associated. The graphical user interface 600 may further comprise a bid bias field 630 to indicate a bid bias value associated with the advertiser and/or the advertiser group as indicated in the advertiser group field 620. As such, the graphical user interface 600 may comprise an advertiser report to display information about an advertiser's associated bid bias and/or advertiser group with a bid bias. The graphical user interface 600 may further comprise a bid bias savings field 640. In some embodiments, the bid savings field 640 may indicate an amount of savings that the advertiser has experienced due to the advertiser's associated bid bias (e.g., the advertiser's associated bid bias value as indicated by the bid bias field 630). For example, if the advertiser is associated with a bid bias value of 25% and if the advertiser has placed 100 winning bids at a value of $1 apiece, then the advertiser's bid savings field 640 may indicate a savings of $25 (e.g., the advertiser transmitted winning bids worth $100 and the advertiser's bids were adjusted upwards by 25% to $1.25, resulting in an effective savings of $25.) As such, the bid savings field 640 may indicate an amount of savings and/or an amount or value that the advertiser has received in the form of adjusted bids from the online advertisement exchange. As seen in FIG. 6, the graphical user interface may comprise an advertiser activity field 650 to indicate activity needed to maintain the advertiser's current bid bias status. For example, the advertiser activity field 650 may indicate that the advertiser may need to maintain a particular advertisement budget (e.g., a predefined value or amount of money to be spent over a predefined amount of time with a particular publisher) with the online advertisement exchange in order to maintain the advertiser's current bid bias. For example, the advertiser activity field 650 may indicate that the advertiser needs to spend $10,000 within the next six months at the online advertisement exchange and/or a publisher in order to maintain the advertiser's current bid bias.

Figure 7:
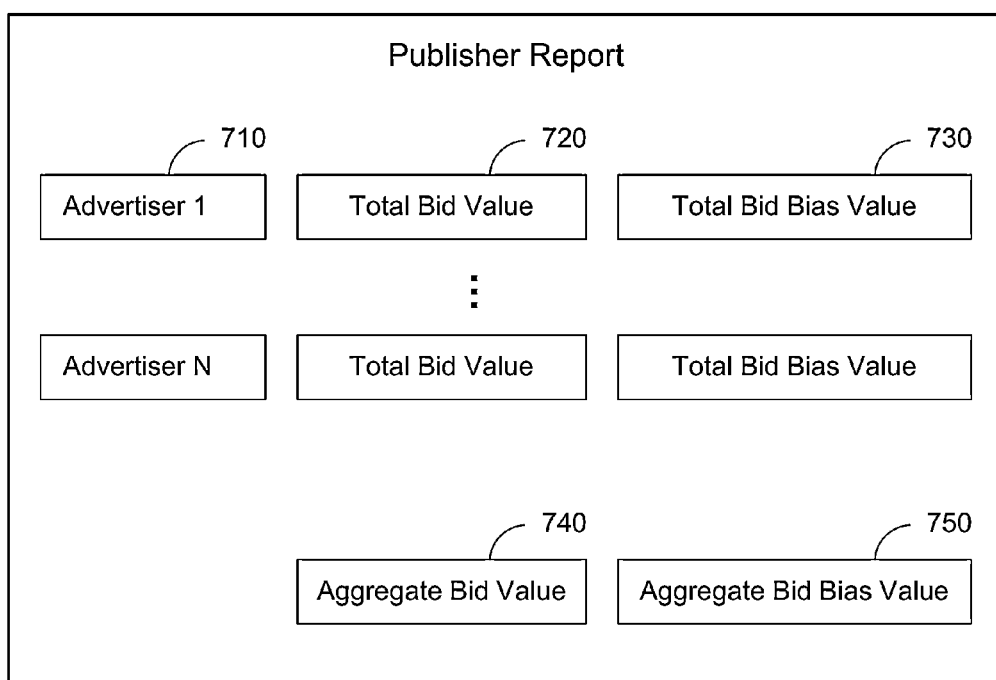
FIG. 7 is an example graphical user interface to display a report associated with a publisher in accordance with some embodiments.

FIG. 7 is an example graphical user interface 700 to display a publisher report associated with a publisher of the online advertisement exchange in accordance with some embodiments. In general, the graphical user interface 700 may be used to show a publisher a report on one or more advertisers and a bid bias associated with the one or more advertisers.

As seen in FIG. 7, the graphical user interface 700 may comprise an advertiser field 710 to indicate an advertiser associated with the publisher (e.g., an advertiser that bids on advertising inventory on a website of the publisher). The graphical user interface 700 may comprise an advertiser bid field 720 to indicate an amount of money that the corresponding advertiser has spent with the publisher (e.g., an amount or value of the advertiser's winning bids that have been placed with the publisher) and a total bid bias value field 730 to indicate an amount or value of discounts (e.g., total value of bid adjustments) that the publisher has awarded to the advertiser. In some embodiments, the graphical user interface 700 may comprise an aggregate bid value field 740 and an aggregate bid bias value field 750 to display total advertiser winning bid values associated with the publisher and total advertiser bid bias values savings or monetary value associated with the publisher, respectively.

Figure 8:
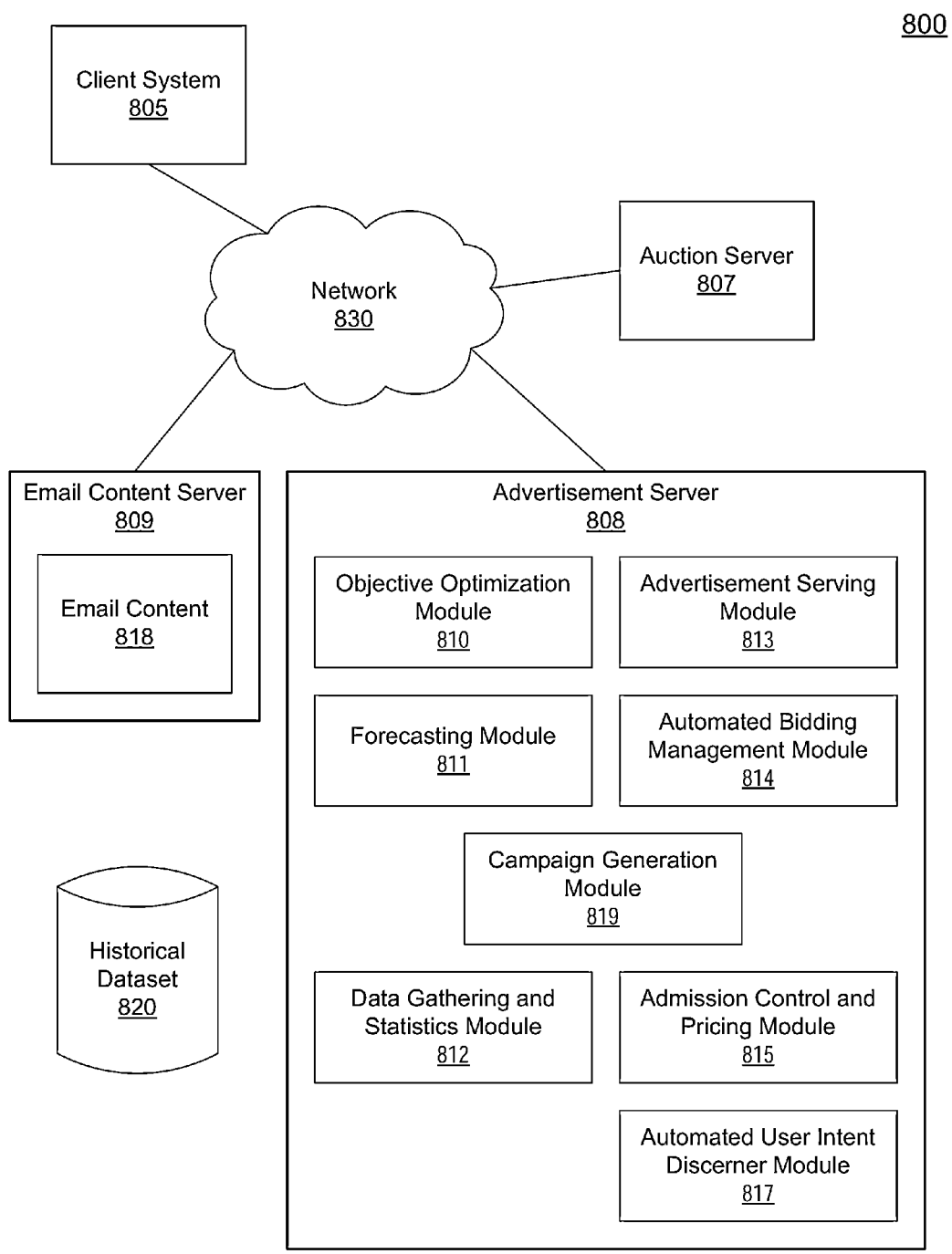
FIG. 8 is an example embodiment of an online advertising system in accordance with some embodiments.

III. System Environment for Implementing Bid Adjustments in an Online Advertisement Exchange FIG. 8 is an example of an online advertising system environment 800. For example, the online advertising system environment 800 may implement a bid adjustment as discussed above. As such, in some embodiments, the methods 100, 300, and 500 may be used in conjunction with the online advertising system environment 800. In the context of online advertising, the online advertisement exchange for implementing bid adjustments may use the online advertising system environment 800. An internet advertiser or agent may select a particular online property (e.g., from a publisher), and may create an advertisement or advertisement opportunity such that whenever any online user, via a client system, requests content from the online property, the advertisement (e.g., a creative) is composited or inserted into the content by one or more servers (e.g., a base content server 809 and/or an advertisement server 808) for delivery to a client system 805 over a network 830. Using such a delivery model and the systems and methods disclosed herein, sophisticated online advertisement exchange techniques may be practiced.

As seen in FIG. 8, an online property may measure the characteristics of users using an advertisement server 808 in conjunction with a data gathering and statistics module 812, and using a historical dataset 820 as pertains to user behavior that has been observed. Thus, an online user's demographics and interest might be 'known' in quite some detail as it pertains to a wide range of user queries, interest categories, or other demographics or attributes. Also, behaviors (e.g., the likelihood of a click or other measurable event) might be known in quite some detail, not only for a particular user, but also for a group of users corresponding to a particular subset of the available data. Such characteristics (e.g., one or more characteristics) and/or features (e.g., one or more features) can be used in statistical modeling of users. That is, a given model can predict the likelihood p of a click c based on a feature set, and thus, a given model can be used to calculate probability p(c|x), that quantity being the probability of a user click response based on the constituents of x.

Such characteristics (i.e., one or more characteristics) and/or features can be used in the statistical modeling of users, even to the extent that a forecasting module 811, possibly in conjunction with a data gathering and statistics module 812, may forecast future supply accurately of opportunities to display advertisements.

In some embodiments, the online advertising system 800 may host a variety of modules to serve management and control operations (e.g., an objective optimization module 810, a forecasting module 811, a data gathering and statistics module 812, an advertisement serving module 813, an automated bidding management module 814, an admission control and pricing module 815, etc.) pertinent to aiding advertisers in defining effective advertisements to users. In particular, the modules, network links, algorithms, forecasting techniques, serving policies, and data structures embodied within the online advertising system 800 may be specialized so as to perform a particular function or group of functions reliably while observing capacity and performance requirements. For example, a campaign generation module 819 and/or an automated user intent discerner module 817 can operate partly in an offline (or batch) mode and partly in an online (or interactive) mode. Further, a database for storing the historical dataset 820 (which can also store historical click data and/or forecasted data) can operate in an online mode and/or in an offline mode. As shown, and without regard to allocation of any particular operation to any particular mode, an auction server 807 and an automated user intent discerner module 817 may be used.

Figure 9:
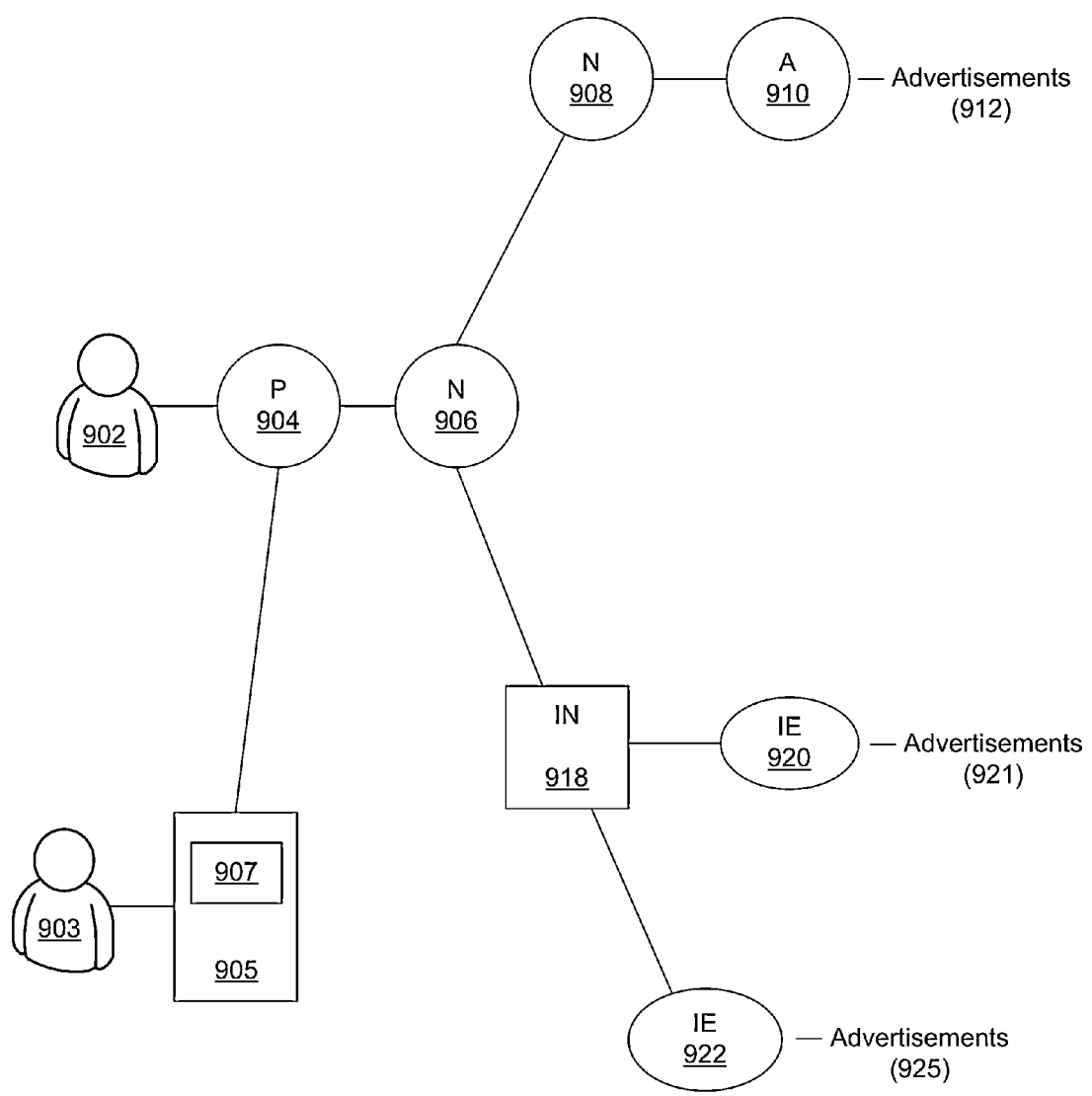
FIG. 9 depicts a diagram illustrating an advertisement delivery system within which some embodiments of the disclosure are implemented.

FIG. 9 illustrates an advertisement delivery system environment 900 within which some embodiments of the disclosure are implemented. In general, the embodiments described herein may be implemented as part of an advertising exchange service. An advertising exchange service may integrate entities such as advertisers and publishers. An advertising exchange service may operate in conjunction with advertisers in order to deliver advertisements, from one or more advertisers, to be received by one or more users.

An integrator network entity may define a participant of the advertising exchange system that represents or integrates one or more entities on the advertising exchange system (e.g., advertisers, advertising networks, etc.). For example, an integrator network may represent advertisers on the advertising exchange system in order to deliver advertisements to advertising networks and other integrator networks. In some embodiments, the integrator networks are referred to as the "users" of the advertising exchange system. The integrated networks may comprise third party agents that operate on behalf of or are part of the integrator network. The term "third party agent" may be used to generally describe an agent or customer that participates in transactions on the advertising exchange system. Similarly, the term "third party recipient" may be used to describe a user or participant of the advertising exchange system that receives information from the system, such as bid requests. However, the terms integrator networks, third party agents and third party recipients may be intended to represent a broad class of entities, including email service hosts, advertisers and networks, as well as the agents that represent them, that operate on the advertising exchange system.

As shown in FIG. 9, the system 900 includes a plurality of entities end users 902 and 903, one or more hosts 904, networks 906 and 908, and/or advertisers 910. The advertisement delivery system 900 further includes one or more integrator networks (IN) 918 that have one or more integrated entities (IE) 920 and 922. The various entities, including users, email service hosts, networks, advertisers, integrator networks and integrated entities, illustrated in FIG. 9 are merely exemplary, and one of ordinary skill recognizes that the system 900 may include any number of entities. Moreover, the various entities are coupled together in different advantageous configurations such as, for example, the exemplary configuration as seen in FIG. 9.

The user 903 may access information and/or content provided by the host 904. For example, a user accessing information and/or content may comprise an client 905 displaying content comprising inventory location(s) 907 for the presentation of advertisement(s). In some embodiments, an advertisement call is generated that requests an advertisement, from advertisements or advertisers 912, 920 and 921, for placement with the inventory location 907. The corresponding advertisement may be delivered to host 904 by one or more networks. In some embodiments, the network 906 may be coupled to the host 904 and the network 908 may be coupled to the advertiser 910. As such, the networks 906 and 908 are coupled to each other. The advertiser 910 may have one or more advertisement campaigns such that each advertisement campaign comprises one or more advertisements 912 that the advertiser 910 wishes to place with the inventory of hosts such as, for example, the inventory location 907 of the host 904 that may be presented to the user 903 via the client application 905.

Figure 10:
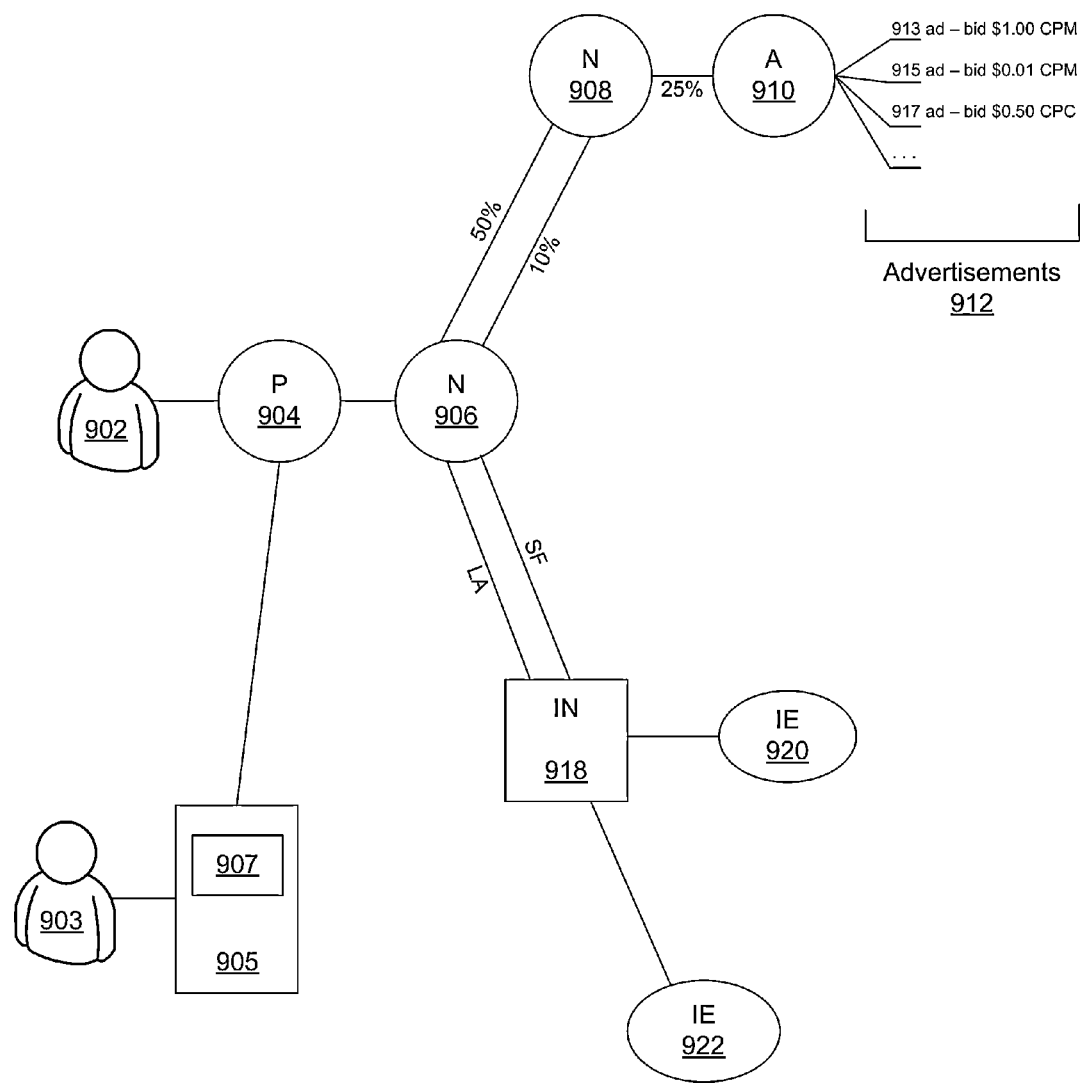
FIG. 10 depicts a diagram illustrating an advertisement delivery system within which some embodiments of the disclosure are implemented

FIG. 10 is another example of an advertisement delivery system 1000. In this example, the advertisements 913, 915, and 917 each may have an associated bid that the advertiser 910 will pay for the placement or insertion of the advertisement with the inventory and for presentation to the user(s). The advertisement 913 may have a bid of $1.00 cost per thousand email impressions ("CPM"), the advertisement 915 may have a bid of $0.01 CPM, and the advertisement 916 may have a bid of $0.50 cost per click ("CPC"). One of ordinary skill in the art would recognize that any different type of advertisement bid might be used in the advertisement delivery system 900. Examples of bids include, but are not limited to, CPM, CPC, and cost per action ("CPA").

As seen in FIG. 10, the entities along the chain of distribution for the advertisements have various revenue sharing agreements. For example, the network 908 may have a 25% revenue sharing agreement with the network 906 for fees paid by the advertiser 910. Similarly, the network 906 may have 50% and 10% revenue sharing agreements with the publisher 904 for fees paid to the network 906 by way of the network 908. The multiple revenue sharing agreements between entities may be for different advertisement campaigns and/or for targeting advertisements to different segments of users (e.g., groups of users). For example, the 50% revenue sharing agreement between networks 908 and 906 may be used to target a user segment that comprises males under 40 years old who have an interest in sports. In some embodiments, the 10% revenue sharing agreement may be used to target females over 30 years old who have an interest in gardening. As such, network 908 may deliver users of the target user segment to network 906, and network 906 is the exclusive representative of the host 904. One of ordinary skill in the art recognizes many different payment and/or targeting schemes.

In the same or alternative embodiments, an advertisement call for the inventory 907 may be directed to an integrator network 918. For example, the advertisement call may pass from the network 806 to the integrator network 918 with additional information. In some embodiments, the additional information may comprise a geographic location for the destination of the advertisement. For example, an advertisement call may have a destination of San Francisco (SF), while a second advertisement call may have a destination of Los Angeles (LA). Based on the advertisement call and/or information, the integrator network 918 may selectively respond to advertisement calls for, or on behalf of, one or more of its integrated entities 920 and/or 922. The integrated entities 920 and 922 may include third party entities, such as advertisers, that transact on the exchange by using an intermediary, such as the integrator network 918.

FIG. 11 is a diagrammatic representation of a network 1100, including nodes for client computer systems $1102_1$ through $1102_N$, nodes for server computer systems $1104_1$ through $1104_N$, nodes for network infrastructure $1106_1$ through $1106_N$, any of which nodes may comprise a machine 1150 within which a set of instructions for causing the machine to perform any one of the techniques discussed above may be executed. The embodiment shown is purely exemplary, and might be implemented in the context of one or more of the figures herein.

Any node of the network 1100 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1150 includes a processor 1108 (e.g. a processor core, a microprocessor, a computing device, etc.), a main memory 1110 and a static memory 1112, which communicate with each other via a bus 1114. The machine 1150 may further include a display unit 1116 that may comprise a touch-screen, or a liquid crystal display (LCD), or a light emitting diode (LED) display, or a cathode ray tube (CRT). As shown, the computer system 1150 also includes a human input/output (I/O) device 1118 (e.g., a keyboard, an alphanumeric keypad, etc.), a pointing device 1120 (e.g., a mouse, a touch screen, etc.), a drive unit 1122 (e.g. a disk drive unit, a CD/DVD drive, a tangible computer readable removable media drive, an SSD storage device, etc.), a signal generation device 1128 (e.g. a speaker, an audio output, etc.), and a network interface device 1130 (e.g. an Ethernet interface, a wired network interface, a wireless network interface, a propagated signal interface, etc.).

The drive unit 1122 includes a machine-readable medium 1124 on which is stored a set of instructions (i.e. software, firmware, middleware, etc.) 1126 embodying any one, or all, of the methodologies described above. The set of instructions 1126 is also shown to reside, completely or at least partially, within the main memory 1110 and/or within the processor 1108. The set of instructions 1126 may further be transmitted or received via the network interface device 1130 over the network bus 1114.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

What is claimed is:

1. A method for conducting an online auction, the method comprising, in an online environment:
receiving, by a computer from a graphical user interface, data specifying one or more advertisers and advertiser attributes, to group a plurality of advertisers, who match the advertiser attributes, into one or more predefined advertiser groups;
receiving, by the computer, a first bid from a first advertiser for an online advertisement opportunity, wherein the first bid indicates a first bid value and is associated with a predetermined first bid bias value;
assigning the predetermined first bid bias value to the first advertiser based on the advertiser attributes of the first advertiser if the first advertiser matches an identification of an advertiser of the one or more advertisers, or an advertiser attribute of the advertiser attributes, received from the graphical user interface as being associated with an advertiser group of the one or more predefined advertiser groups that identifies the plurality of advertisers, respective advertisers of the plurality of advertisers having respective bid values;
receiving, by the computer, a second bid from a second advertiser for the online advertisement opportunity, wherein the second bid indicates a second bid value;
adjusting as a group, by the computer, the first bid value of the first bid from the first advertiser and the respective bid values from the plurality of advertisers identified as being associated with the advertiser group, with an amount that is a discount to the predetermined first bid bias value or a markup to the predetermined first bid bias value, to calculate a first adjusted bid value for the first advertiser and respective adjusted bid values for the plurality of advertisers associated with the advertising group to enable managing bids of the first advertiser and the plurality of advertisers as a group to thereby reduce data processing and storage requirements, wherein the predetermined first bid bias value is assigned to the first advertiser and the plurality of advertisers based on advertiser attributes of the first advertiser and the plurality of advertisers;
awarding, by the computer, the online advertisement opportunity to the first advertiser when the first adjusted bid value is higher than the second bid value;

charging, by the computer, the first advertiser the first bid value when the first advertiser is awarded the online advertisement opportunity based on the first adjusted bid value; and receiving an advertising call that requests an advertisement; and based on the awarded online advertisement opportunity, in response to the received advertising call, communicating a selected advertisement to an end user.

2. The method of claim 1, wherein the first adjusted bid value is calculated by increasing or decreasing the first bid value by a factor specified by the predetermined first bid bias value.

3. The method of claim 1, further comprising receiving in a first bid bias field of the graphical user interface a first bid bias amount defining the predetermined first bid bias value for the first advertiser and the plurality of advertisers and assigning the predetermined first bid bias value to the first advertiser and the plurality of advertisers before receiving the first bid if the first advertiser and the plurality of advertisers matches the identification as being associated with the advertiser group.

4. The method of claim 3, wherein the first bid bias amount specifies bid bias values to be applied to any bids received from any advertisers specified by the identification.

5. The method of claim 3, further comprising receiving an advertiser group field forming identification of the first advertiser as being associated with the advertiser group that identifies the plurality of advertisers.

6. The method of claim 1, wherein the first bid value is lower than the first adjusted bid value and the predetermined first bid bias value comprises a discount for the first advertiser such that the charging of the first advertiser with the first adjusted bid value is lower than charging the first advertiser with the first bid value.

7. A non-transitory computer readable medium carrying one or more instructions for conducting an online auction, wherein the one or more instructions, when executed by one or more processors, causes the one or more processors to perform acts of:
receiving, by a computer from a graphical user interface, data specifying one or more advertisers and advertiser attributes, to group a plurality of advertisers, who match the advertiser attributes, into one or more predefined advertiser groups;

assigning a first advertiser a first bid bias value based on the advertiser attributes of the first advertiser if the first advertiser matches an identification of an advertiser of the one or more advertisers, or an advertiser attribute of the advertiser attributes, received from the graphical user interface as being associated with an advertiser group of the one or more predefined advertiser groups that identifies a plurality of advertisers, the first bid bias value specified for a group of advertisers including the first advertiser, each respective advertiser of the group of advertisers having a respective bid value;

receiving a first bid from a first advertiser for an online advertisement opportunity after the assigning the first bid bias value, wherein the first bid indicates a first bid value;

receiving a second bid from a second advertiser for the online advertisement opportunity, wherein the second bid indicates a second bid value;

adjusting the first bid value of the first bid from the first advertiser and the respective bid values of the respective advertisers of the group of advertisers based on the first bid bias value to calculate a first adjusted bid value, the first adjusted bid value being one of a discount to the first bid value and a markup to the first bid value, so that bids of the advertisers of the group of advertisers may be managed together to reduce data processing and storage requirements;

awarding the online advertisement opportunity to the first advertiser when the first adjusted bid value is higher than the second bid value;

charging the first advertiser the first bid value when the first advertiser is awarded the online advertisement opportunity based on the first adjusted bid value;

receiving an advertising call that requests an advertisement; and based on the awarded online advertisement opportunity, in response to the received advertising call, communicating a selected advertisement to an end user.

8. The non-transitory computer readable medium of claim 7, wherein the first adjusted bid value is calculated by increasing or decreasing the first bid value by a factor specified by the first bid bias value.

9. The non-transitory computer readable medium of claim 7, wherein the assigning of the first bid bias value is based on a predefined attribute of the first advertiser.

10. The non-transitory computer readable medium of claim 9, wherein the predefined attribute of the first advertiser comprises an advertising budget associated with the first advertiser.

11. The non-transitory computer readable medium of claim 9, further comprising receiving in an advertiser group field of a user interface data defining the advertiser group and associating the first advertiser and respective advertisers of the group of advertisers with the group of advertisers using the data defining the one or more predefined advertiser groups.

12. The non-transitory computer readable medium of claim 9, wherein the predefined attribute of the first advertiser comprises targeting information associated with the first advertiser.

13. The non-transitory computer readable medium of claim 7, wherein the first bid value is lower than the first adjusted bid value and the first bid bias value comprises a discount for the first advertiser such that the charging of the first advertiser with the first adjusted bid value is lower than charging the first advertiser with the first bid value.

14. A system, comprising at least one processor and memory, wherein the memory is loaded with a set of instructions for conducting an online auction, the processor is configured to communicate with the memory and to execute the set of instructions to:
receive, by a computer from a graphical user interface, data specifying one or more advertisers and advertiser attributes, to group a plurality of advertisers, who match the advertiser attributes, into one or more predefined advertiser groups;

receive a first bid from a first advertiser for an online advertisement opportunity, wherein the first bid indicates a first bid value and is associated with a predetermined first bid bias value;

receive respective bids from respective advertisers for the online advertisement opportunity, wherein the respective bids indicate respective bid values and are associated with the predetermined first bid bias value;

receive from the graphical user interface a grouping indication that the first bid from the first advertiser and the respective bids from the respective advertisers are to be processed together as a group, the grouping indication including identification of advertisers to be included in the group or advertiser attributes of advertisers to be included in the group;

receive a second bid from a second advertiser for the online advertisement opportunity, wherein the second bid indicates a second bid value and is associated with a predetermined second bid bias value;

adjust the first bid value of the first bid from the first advertiser commonly with the respective bid values from the respective advertisers of the group, based on the first predetermined bid bias value, to calculate a first adjusted bid value, the first adjusted bid value being a discount to the first bid value or a markup to the first bid value, wherein the predetermined first bid bias value is assigned to the first advertiser and the respective advertisers based on advertiser attributes of the first advertiser and the respective advertisers of the group, the first bid value and the respective bid values adjusted together as a group to reduce data processing and storage requirements;

adjust the second bid value of the second bid from the second advertiser based on the predetermined second bid bias value to calculate a predetermined second adjusted bid bias value, wherein the predetermined second bid bias value is assigned to the second advertiser based on advertiser attributes of the second advertiser;

award the online advertisement opportunity to the first advertiser when the first adjusted bid value is higher than the predetermined second adjusted bid bias value;

charge the first advertiser the first bid value when the first advertiser is awarded the online advertisement opportunity based on the first adjusted bid value;

receive an advertising call that requests an advertisement; and based on the awarded online advertisement opportunity, in response to the received advertising call, communicating a selected advertisement to an end user.

15. The system of claim 14, wherein the first adjusted bid value and respective bid values are calculated by increasing or decreasing the first bid value and the respective bid values by a factor specified by the predetermined first bid bias value and the respective bid values.

16. The system of claim 14, further comprising assigning the predetermined first bid bias value to the first advertiser before receiving the first bid if the first advertiser matches at least one predefined advertiser attribute; and assigning the predetermined second bid bias value to the second advertiser before receiving the second bid if the second advertiser matches the at least one predefined advertiser attribute.

17. The system of claim 16, wherein the predefined advertiser attribute comprises an advertising budget associated with the first advertiser.

18. The system of claim 16, wherein receiving a grouping indication comprises receiving in an advertiser group field of a user interface data defining an identification of the first advertiser and the respective advertisers as being associated with an advertiser group that identifies the plurality of advertisers.

19. The system of claim 14, wherein the first bid value is lower than the first adjusted bid value and the predetermined first bid bias value comprises a discount for the first advertiser such that charging of the first advertiser with the first adjusted bid value is lower than charging the first advertiser with the first bid value.

* * * * *